US009575715B2

(12) United States Patent
Duwenhorst et al.

(10) Patent No.: US 9,575,715 B2
(45) Date of Patent: Feb. 21, 2017

(54) LEVELING AUDIO SIGNALS

(75) Inventors: Sven Duwenhorst, Hamburg (DE); Holger Classen, Hamburg (DE)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 773 days.

(21) Appl. No.: 12/122,629

(22) Filed: May 16, 2008

(65) Prior Publication Data

US 2015/0205571 A1    Jul. 23, 2015

(51) Int. Cl.
| | |
|---|---|
| *G10L 21/02* | (2013.01) |
| *G10L 21/0316* | (2013.01) |
| *G10L 25/03* | (2013.01) |
| *G06F 3/16* | (2006.01) |
| *G05B 15/02* | (2006.01) |
| *G11B 27/00* | (2006.01) |

(52) U.S. Cl.
CPC ............ *G06F 3/165* (2013.01); *G05B 15/02* (2013.01); *G11B 27/00* (2013.01)

(58) Field of Classification Search
CPC ..... G10L 21/02; G10L 21/0316; G10L 25/03; G06F 3/165
USPC ............... 704/203, 211, 225, 226, 228, 502; 455/232.1, 242.1, 245.1; 381/94.5, 106, 381/107, 104; 708/202, 304
See application file for complete search history.

(56) References Cited

U.S. PATENT DOCUMENTS

| | | | | |
|---|---|---|---|---|
| 4,169,219 | A * | 9/1979 | Beard ......................... | 369/47.25 |
| 5,146,504 | A * | 9/1992 | Pinckley ...................... | 704/225 |
| 5,732,390 | A * | 3/1998 | Katayanagi et al. ......... | 704/227 |
| 5,752,226 | A * | 5/1998 | Chan et al. ................... | 704/233 |
| 5,825,754 | A * | 10/1998 | Williams ...................... | 370/290 |
| 5,832,444 | A * | 11/1998 | Schmidt ........................ | 704/500 |
| 5,900,006 | A * | 5/1999 | Yoon ............................ | 708/202 |
| 5,933,808 | A * | 8/1999 | Kang et al. ................... | 704/278 |
| 6,088,461 | A * | 7/2000 | Lin et al. ...................... | 381/104 |
| 6,088,668 | A * | 7/2000 | Zack ............................ | 704/225 |
| 6,199,084 | B1 * | 3/2001 | Wiseman ...................... | 708/304 |
| 6,420,986 | B1 * | 7/2002 | Shahaf et al. ............... | 341/139 |
| 6,535,846 | B1 * | 3/2003 | Shashoua ..................... | 704/225 |

(Continued)

OTHER PUBLICATIONS

Guy McNally "Dynamic Range Control of Digital Audio Signals" Journal of the Audio Engineering Society, vol. 32, No. 5, May 1984, pp. 316-327.

(Continued)

*Primary Examiner* — Martin Lerner (74) *Attorney, Agent, or Firm* — Shook, Hardy & Bacon L.L.P (57) ABSTRACT

The present specification relates to systems, methods, and apparatus including computer program products for editing digital audio data. In some implementations, a method is provided that includes the actions of receiving digital audio data; dividing the audio data into first audio data and second audio data; performing on-line processing of the first and second audio data including segmenting the first audio data according to one or more partitioning parameters into discrete time partitions, sequentially analyzing for each discrete time partition the first audio data of the corresponding discrete time partition, and modifying the second audio data according to the analysis of the first audio data; and outputting the modified second audio data.

29 Claims, 6 Drawing Sheets

(56) References Cited

U.S. PATENT DOCUMENTS

| | | | |
|---|---|---|---|
| 6,618,701 B2* | 9/2003 | Piket | G10L 25/78 |
| | | | 704/226 |
| 6,766,176 B1* | 7/2004 | Gupta et al. | 455/550.1 |
| 7,013,011 B1* | 3/2006 | Weeks et al. | 381/98 |
| 7,133,825 B2* | 11/2006 | Bou-Ghazale | G10L 21/0208 |
| | | | 704/226 |
| 7,146,316 B2* | 12/2006 | Alves | G10L 21/0208 |
| | | | 704/227 |
| 7,742,746 B2* | 6/2010 | Xiang et al. | 455/63.1 |
| RE43,189 E* | 2/2012 | Liljeryd | G10L 21/038 |
| | | | 704/225 |
| 8,374,362 B2* | 2/2013 | Ramakrishnan | H04R 3/005 |
| | | | 381/122 |
| 2005/0119882 A1* | 6/2005 | Bou-Ghazale | G10L 21/0208 |
| | | | 704/227 |
| 2007/0096961 A1* | 5/2007 | Sakiyama et al. | 341/76 |

OTHER PUBLICATIONS

"The Levelator" [online] [retrieved on May 14, 2008]. Retrieved from the Internet: <URL: http://www.conversationsnetwork.org/levelator>, 3 pages.

* cited by examiner

LEVELING AUDIO SIGNALS

BACKGROUND

The present disclosure relates to digital audio data.

Digital audio data is associated with a number of different parameters. The audio data has a level value based on the energy that is contained in the audio data. This level value is typically referred to as a root mean square (RMS) value of the audio data. The audio data also has a peak value. The peak value is a maximum amplitude value for the audio data within a specified time (e.g., one period of an audio waveform of the audio data). The ratio of the peak value and the RMS value over a specified time for the audio data is referred to as a crest factor. A high crest factor indicates audio peak intensities that are higher than the RMS value for the audio data.

Additionally, the audio data can be edited. A user can apply different processing operations to portions of the audio data to generate particular audio effects. For example, the audio data can be adjusted by a user to increase amplitude of the audio data (e.g., by increasing the overall intensity of the audio data) across time. This is typically referred to as applying a gain to the audio data. In another example, the amplitude of audio data can be adjusted over a specified frequency range. This is typically referred to as equalization.

The signal intensity of audio data can vary over time. Depending on several factors, e.g., background noise, number of distinct audio signal sources, or individual signal intensities, the audibility of audio data or the audibility of audio signals contained in the audio data may be suboptimal. An example of audio data containing audio signals having different intensity are voice recordings. The voices of different speakers located at different positions, relative to the position of the audio recording equipment (e.g., a microphone), result in differences in a number of aspects including tonality, intensity, or dynamics. Additionally, the speakers may exhibit behavior that influences the audio properties of their voices substantially, e.g., by turning their heads or changing position. Other factors may also exist that influence the recording of audio data.

SUMMARY

The present specification relates to systems, methods, and apparatus including computer program products for editing digital audio data. In general, one aspect of the subject matter described in this specification can be embodied in methods that include the actions of receiving digital audio data; dividing the audio data into first audio data and second audio data; performing on-line processing of the first and second audio data including segmenting the first audio data according to one or more partitioning parameters into discrete time partitions, sequentially analyzing for each discrete time partition the first audio data of the corresponding discrete time partition, and modifying the second audio data according to the analysis of the first audio data; and outputting the modified second audio data. Other embodiments of this aspect include corresponding systems, apparatus, and computer program products.

These and other embodiments can optionally include one or more of the following features. The partitioning parameters include a partition count, a partition size, and an offset value. The aspect can further include determining a time delay according to the partitioning parameters and delaying the second audio data by the time delay. The analysis includes determining a root mean square value, a peak value, and a crest factor for the first audio data associated with the discrete time partition. The aspect can further include sequentially inserting, for each discrete time partition, an element into a first data structure, the element including one or more of the root mean square value, the peak value, and the crest factor.

The aspect can further include using the first data structure according to first data structure parameters, the first data structure parameters being determined according to the partitioning parameters, the first data structure parameters including a data structure size and an index, the first data structure being a first-in-first-out data structure having a first and a last element. The aspect can further include storing in a second data structure all the root mean square values stored in the first data structure and sorting the root mean square values in the second data structure according to the sorting criteria. The aspect can further include using the second data structure according to second data structure parameters, the second data structure parameters being determined according to the partitioning parameters, the second data structure parameters including a data structure size and an index.

The modification of the second audio data includes applying a gain change. The aspect can further include identifying a mapping table including mappings from input data to output data; determining the gain change according to a root mean square value stored for one or more of the discrete time partitions; and determining an output value applying the gain change using a mapping of the root mean square value in the mapping table, an attack time, and a release time. The aspect can further include determining a current noise floor value according to a plurality of noise estimator parameters including a previous noise floor value, a damping factor, and a root mean square value stored in a data structure at the element identified by a noise floor source index. The aspect can further include using a noise gate having one or more noise gate parameters and controlling the noise gate parameters according to the noise estimator parameters at intervals determined according to the partitioning parameters.

Particular embodiments of the subject matter described in this specification can be implemented to realize one or more of the following advantages. Audio data including voice recordings can be processed to significantly enhance the audibility and clarity of voices having different signal intensity and in relation to background noise. The audio data can be processed on-line, i.e., the processing can be applied in connection with live audio recording and playback. Preprocessing or off-line processing of the audio data, e.g., scanning a complete audio data file, is not necessary. Individual components can be arranged and configured for individual applications. Some applications require, for example, amplification of weak signals and attenuation of loud signals. Other applications require only amplification of weak signals or attenuation of loud signals. Individual requirements can be adapted to by the arrangement of processing components and their configuration.

The processing provides audio data having a high level of quality (e.g., speech is clearly understandable) in the presence of different levels of background noise. The result is an audio signal that is equally loud over time, which increases speech intelligibility and reduces the overall crest factor of the signal. The processing can be incorporated, for example, in entertainment devices (e.g., radios, TVs, CD players, DVD players, mp3 players), in otological applications (e.g., hearing aids), in communication devices (e.g., phones, audio/video conferencing devices), and recording equipment (e.g., as a level controlling mechanism in microphones or in an analog/digital converter with a microphone input).

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
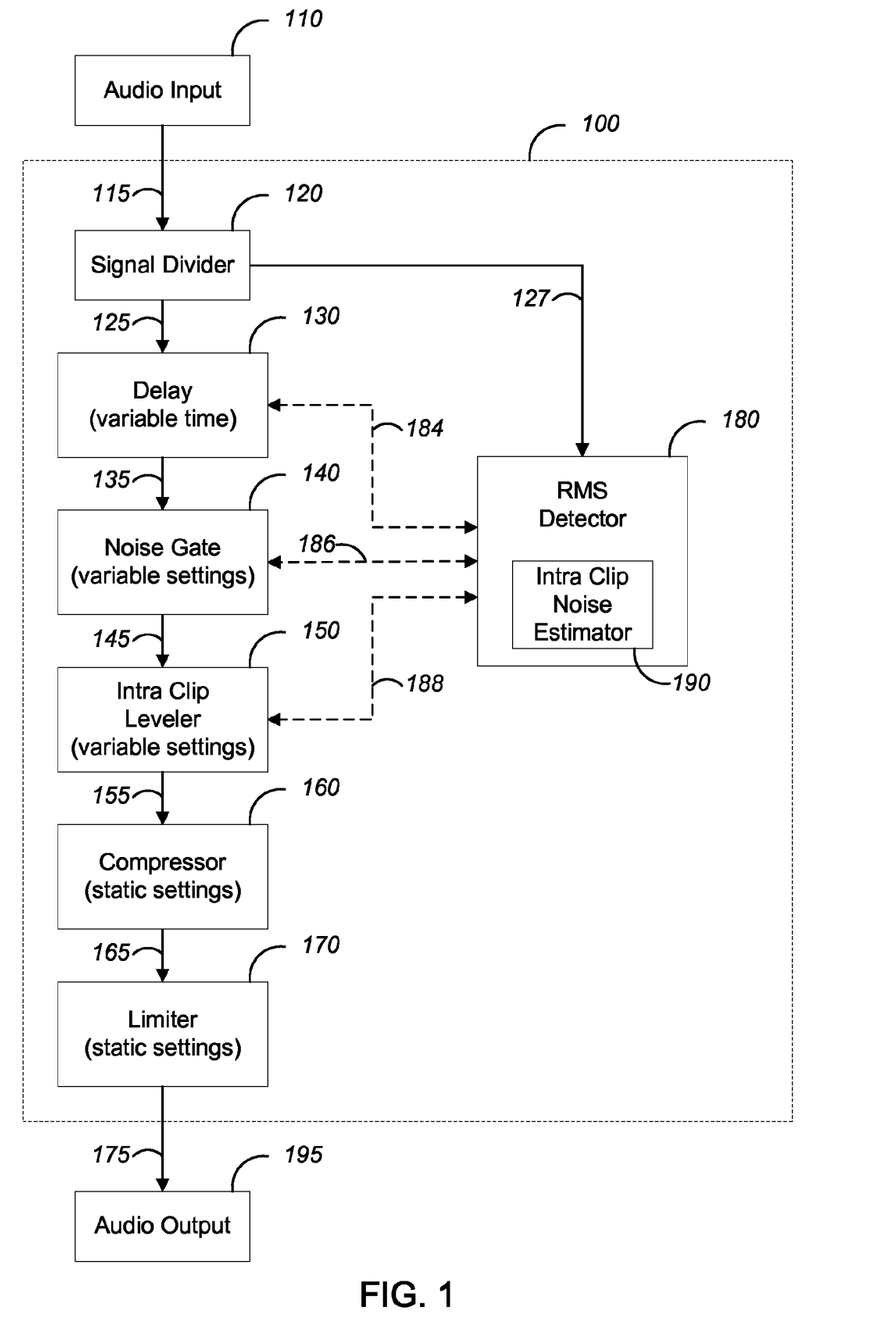
FIG. 1 is a block diagram showing an example arrangement of audio components and signal processing flows.

FIG. 1 is a block diagram showing an example arrangement 100 of audio components and signal processing flows. Audio data flow with respect to the audio components of the arrangement 100 is illustrated using arrows having solid lines. In some implementations, audio data flow is uni-directional. Control data flow, e.g., for configuration of components or flow of control data between components, is illustrated using arrows having dashed lines. Control data flow can be uni-directional or bi-directional. Bi-directional control data flow may be used, for example, in feedback driven components (e.g., when the processing of one component alters parameters of one or more other components).

Audio data 110 received from one or more audio sources are input along an audio data flow 115 to a signal divider 120. The audio data can include, for example, audio files received locally or remotely as well as live recording from one or more recording devices. The signal divider 120 provides one or more identical copies of the input audio data. Thus, different audio components can subsequently access different copies of the audio data output from the signal divider 120. In particular, FIG. 1 shows audio data output from the signal divider 120 along an audio data flow 127 to an RMS detector 180 and audio data output from the signal divider 120 along an audio data flow 125 to a delay component 130.

The delay component 130 can receive control data along a control data flow 184 from the RMS detector 180, for example, setting the time delay to be applied to the audio data by the delay component 130. The time delay provided by the delay component 130, for example, allows the audio to be processed by one or more audio components using information from the analysis of the audio data by the RMS detector 180.

Alternatively, the delay component 130 can also be configured not to delay the audio signal (e.g., setting a zero time delay). A noise gate 140 receives the delayed (or non-delayed) audio data from the delay component 130 along an audio data flow 135. Additionally, an intra clip leveler 150 receives the audio data from the noise gate 140 along an audio data flow 145. An optional compressor 160 receives the audio data from the intra clip leveler 150 along an audio data flow 155 and an optional limiter 170 receives the audio data from the compressor 160 along an audio data flow 165.

As shown in FIG. 1, after passing through the limiter 170, the audio data are output for playback, storage, or further processing (e.g., editing and display) outside of the arrangement 100 along an audio data flow 175. The noise gate 140 and the intra clip leveler 150 can also receive control data from the RMS detector 180 along control data flows 186 and 188 respectively. Details of the individual control data flow between the RMS detector 180, the delay 130, the noise gate 140, and the intra clip leveler 150 are described in greater detail below. Additionally, a description of the optional compressor 160 and the limiter 170 also follows below.

The RMS detector 180 receives the audio data from the signal divider 120. The RMS detector 180 partitions the received audio data into a specified number of discrete time partitions. The RMS detector 180 partitions the audio data according to a number of partitioning parameters, which can include a partition count, a partition size, and an offset value. In some implementations, each discrete time partition has an equal duration. Parameters may be adjusted dynamically, e.g., by user input or as a result of processing in the same or another component. In some implementations, the partitioning includes ten time partitions with each having a duration of 50 ms.

The offset value can be used to provide an offset in time between an applied effect from a given audio component (e.g., a gain increase) and the time at which a particular audio level triggering the effect occurs. For example, the offset value can be used to shift the loudness of the audio signal in time in a particular direction depending on whether the offset is positive or negative. In some implementations, the offset is a negative number. Thus, for example, when the RMS value rises, the intra clip leveler 150 can start decreasing the gain at a point in time earlier than when the level actually rises. This can be performed, for example, when a highest detected RMS value is not used, as will be described in greater detail below.

Two data structures (e.g., buffers) are maintained and configured according to individual parameters and the partitioning parameters. In some implementations, the data structures are arrays and the individual parameters include, for example, an array size, an index, and element contents, e.g., the type and size of variables in single element. For example, the first data structure can be a first-in-first-out (FIFO) array having an array size of ten elements, an index, and a first and a last element. Each element in the first data structure can hold several values, including, e.g., an RMS value, a peak value, and a crest factor. The second data structure is also an array holding ten elements and also has an index. Each element in the second data structure can hold several values, including, e.g., an RMS value. Other data structures may be used, for example, those having features similar to a FIFO array (e.g., ring buffers).

Sequentially, for each discrete time partition of the audio data, the audio data within the time partition is analyzed. The analysis can include, e.g., determining one or more of an RMS value, a peak value, and a crest factor for the audio data within the particular time partition. These values are sequentially stored (e.g., corresponding to each time partition analyzed in sequence) in the first data structure. Once the elements of the first data structure are fully populated with values (e.g., following an analysis of a specified number of time partitions corresponding to a number of elements in the array), analyzing a next discrete time partition results in the values corresponding to this time partition replacing the values of the element holding the oldest values. After analysis of the audio data in a particular time partition, the RMS values from the first data structure are copied into the second data structure.

The elements in the second data structure are sorted according to one or more specified sorting criteria. For example, elements can be sorted ascending by the corresponding RMS values so that the value stored in the element with the lowest index holds a minimum RMS value and the value stored in the element with the highest index holds a maximum RMS value. In some implementations, the copying of values from the first to the second data structure is optimized in one of several commonly known ways, e.g., such that all values from the first data structure are not necessarily copied. Thus, an online processing can be performed by the RMS detector 180 that identifies RMS values of audio data at particular points in time.

Figure 3:
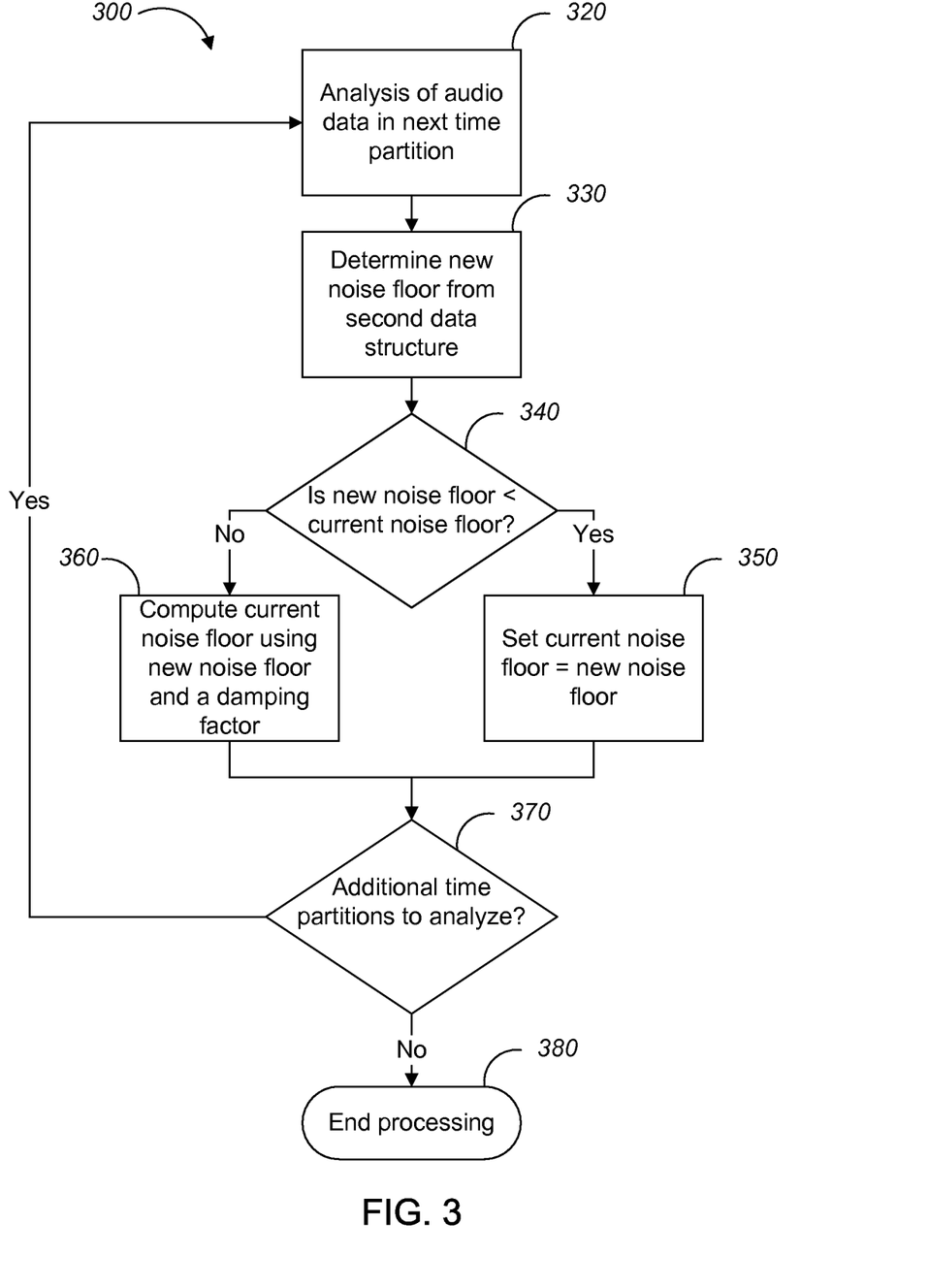
FIG. 3 is a flowchart showing an example process for determining a current estimated noise floor.

The intra clip noise estimator 190 determines and maintains a current estimated noise floor using, e.g., the detected RMS values of the audio data. FIG. 3 shows an example process 300 for determining a current estimated noise floor. For convenience, the process 300 will be described with respect to a component (e.g., a noise estimator) that performs the process 300, e.g., the intra clip noise estimator 190.

The noise estimator analyzes 320 audio data for a next time partition. For the time partition, the noise estimator determines 330 a new current estimated noise floor. The RMS value stored in the element with the lowest index in the second data structure is regarded as the new estimated noise floor. In some implementations, additional processing to improve the value of the estimated noise floor is performed, for example, using additional data (e.g., using other values from the second data structure). The noise estimator determines 340 whether the new estimated noise floor is less than the current noise floor. When the new estimated noise floor is lower than the current estimated noise floor, the noise estimator sets 350 the current estimated noise floor to the value of the new estimated noise floor. When the new estimated noise floor is higher than the current estimated noise floor, the noise estimator incorporates 360 the new estimated noise floor into the current estimated noise floor using a damping factor d. The damping factor results in the current level being adjusted gradually to a higher value, instead of being adjusted instantly. The new estimated noise floor, $n_{est}$, is incorporated into the current estimated noise floor according to the following formula:

$$n_{est}(i) = \begin{cases} dn_{est}(i-1) + (1-d)v[0]; & \text{if } n_{est}(i-1) < v[0] \\ v[0]; & \text{otherwise} \end{cases}$$

The value v[0] denotes the value stored in the second data structure in the element with the lowest index. The damping factor d determines how slowly or quickly the current estimated noise floor is raised. A higher value for the damping factor indicates a slower attack, i.e., the current estimated noise floor rises slowly. A lower value of the damping factor indicates a faster attack, i.e., the current estimated noise floor rises quickly. In some implementations, the damping factor can have a value in the range [0, 1].

The noise estimator can be set to a lower bound, e.g., −80 dB, so that the current estimated noise floor cannot become smaller than the lower bound. The noise estimator determines 370 whether a specified number of time partitions have been analyzed (e.g., all time partitions) and a current noise floor estimated. If there are additional time partitions to be analyzed, the process repeats once per time partition. If there are no further time partitions to be analyzed, the noise estimator ends 380 the processing.

The delay component 130 receives control data from the RMS detector 180 configuring the time delay that is to be applied to the audio data. In some implementations, the time delay is set to 500 ms (ten partitions, each with a duration of 50 ms). The time delay may be set once, or it may be set continuously, e.g., once per time duration, or more often. In some implementations, the time delay is set once at the start of the processing, and it is determined by the RMS detector 180 according to the number of time partitions and their durations.

The noise gate 140 receives control data from the RMS detector 180. For example, the noise gate 140 determines a minimum signal level (i.e. a threshold) for audio data that can pass and is set dynamically to the current estimated noise floor determined by the intra clip noise estimator 190. As a result, audio data having a signal level below the threshold set in the noise gate 140 is blocked and audio data having a signal level of at least the threshold set in the noise gate 140 passes. In some implementations, the noise gate 140 is configured to behave like a noise expander, e.g., using a ratio parameter of 2. When the ratio parameter is set to $\infty$, the noise gate 140 behaves like a gate.

Figure 4:
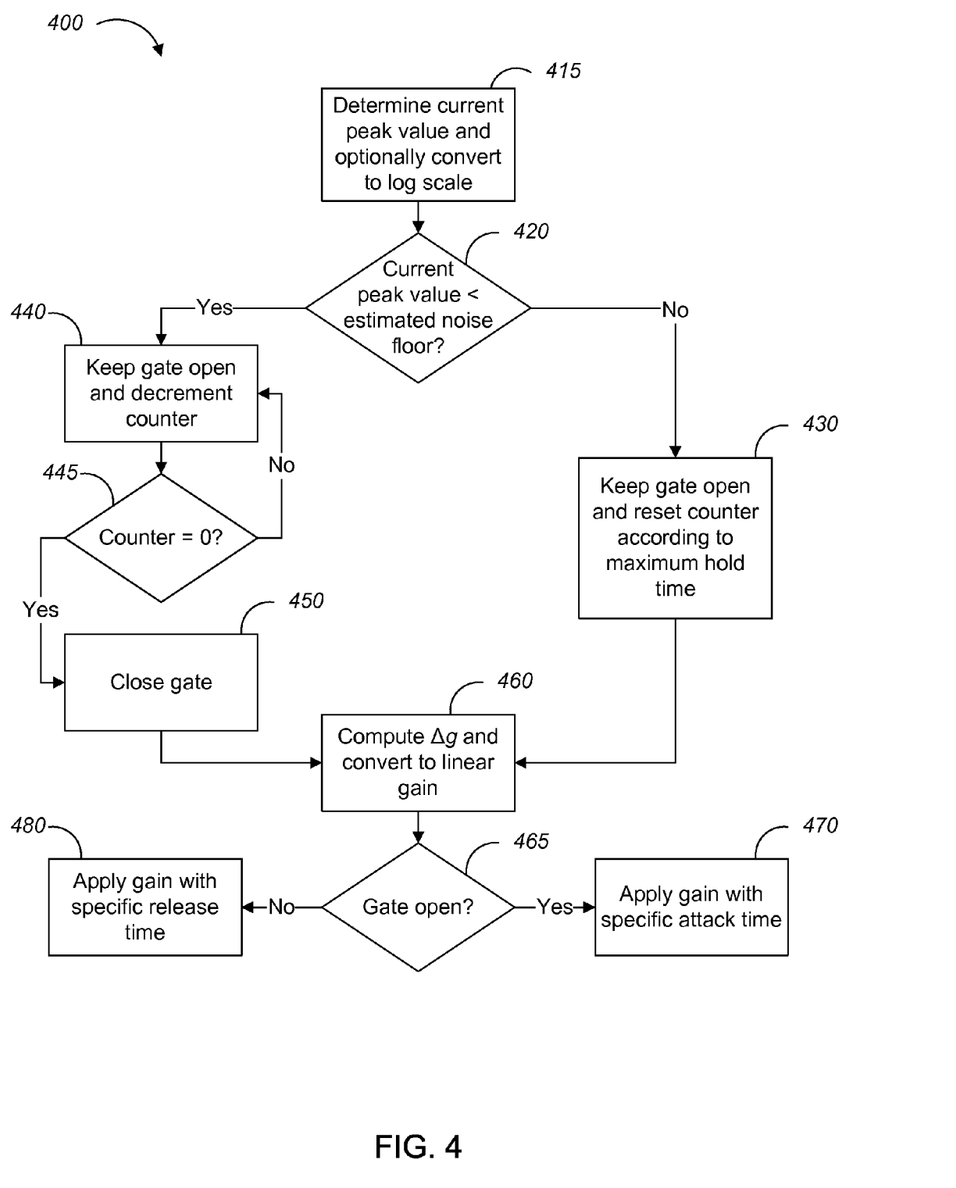
FIG. 4 is a flowchart showing an example process for configuring a noise gate.

FIG. 4 shows an example process 400 for configuring the noise gate 140. For convenience, the process 400 will be described with respect to a component, for example, a noise gate, that performs the process 400 (e.g., the noise gate 140). The noise gate computes 415 a current peak value of the audio data and optionally converts the current peak value to a logarithmic scale, e.g., a dB scale.

The noise gate determines 420 whether the current peak value is less than the estimated noise floor (estimated, e.g., using the intra clip noise estimator 190). When the current peak value is lower than the estimated noise floor, the noise gate is kept open 440 for a specific hold time, e.g., 250 ms. A corresponding counter, representing the hold time by the number of samples, e.g., 44.1 or 48 thousand samples per second, is decremented. When the noise gate determines 445 that the counter has reached 0, the gate is closed 450 and the noise gate calculates 460 a gain change $\Delta g$. The gain change is calculated as:

$$\Delta g = (s_{peak} - v[0])2 + v[0]$$

The difference between the noise gate threshold and the current peak level $s_{peak}$ is used to compute a linear gain. In some implementations, the difference is multiplied by a factor of 2, i.e., the difference is expanded. Alternatively, the difference can be multiplied by a factor between 0 and 1. Factors in the range of [0; 1] compress the difference, factors greater than 1 expand the difference.

When the current peak value is higher than the estimated noise floor, the noise gate is kept open 430 and the counter is reset to its maximum hold time in samples. In some implementations, for a maximum hold time of 250 ms and a sample rate of 44.1 thousand samples per second, the counter is reset to the value 11025.

The noise gate computes 460 the gain change and converts it to a linear gain 460. When 465 the gate is open, the noise gate applies 470 the linear gain with a specified attack time (e.g., 10 ms). Otherwise, the noise gate applies 480 the linear gain with a specified release time (e.g., 1000 ms). The values for attack and release times can be adjusted, for example according to user input, to provide particular results. The values can also be adjusted as a result of processing in the same or another audio component. Thus, a specified gain can be applied to the audio data based on the peak value and noise floor of the audio data.

Figure 5:
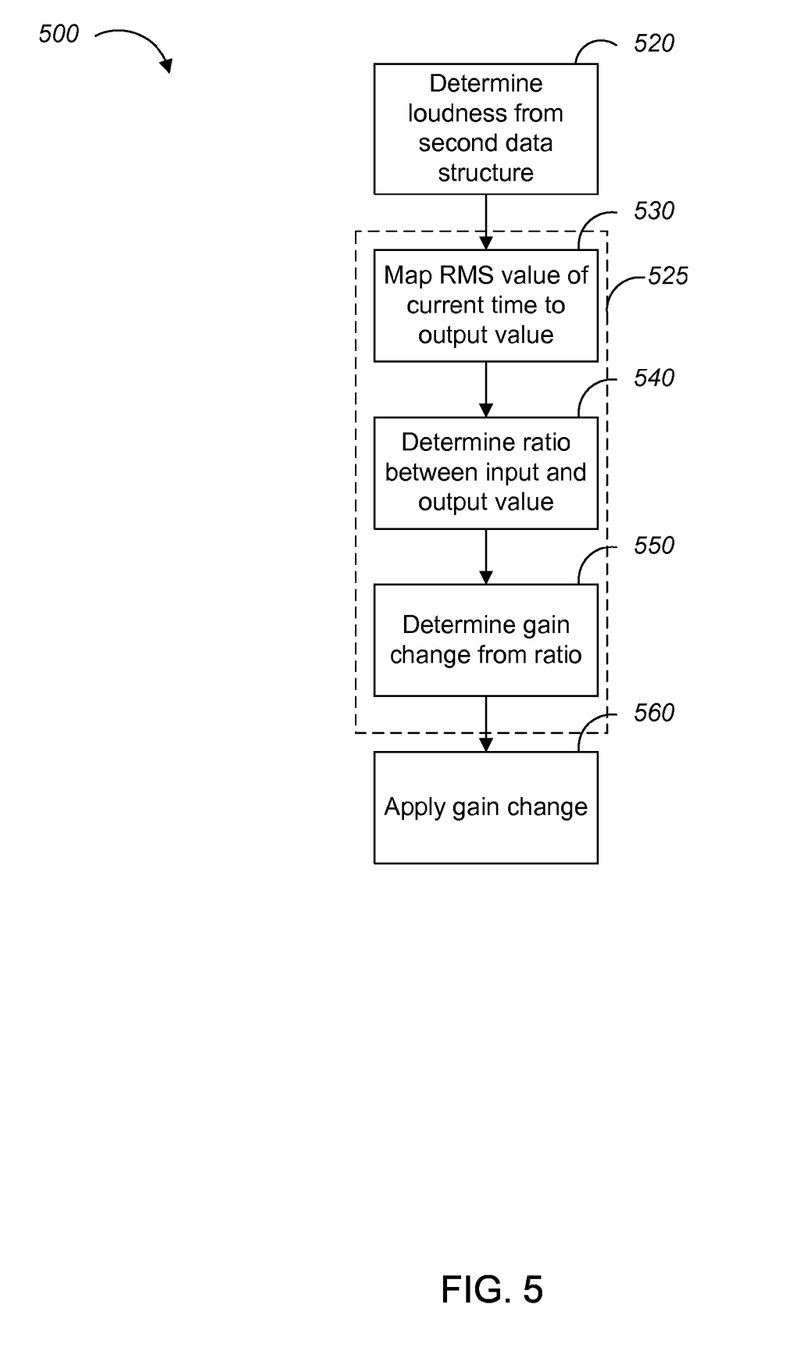
FIG. 5 is a flowchart showing an example process for configuring an intra clip leveler.

The intra clip leveler (compressor) 150 receives control data from the RMS detector 180 for configuring the compressor for the audio data, e.g., applying a gain change to the audio data. FIG. 5 shows an example process 500 for configuring the intra clip leveler 150. For convenience, the process 500 will be described with respect to a component, e.g., an intra clip leveler, that performs the process 500 (e.g., the intra clip leveler 150). For each time partition, the intra clip leveler estimates 520 the loudness (e.g., a perceived intensity) of the audio data using an index and the RMS values stored the second data structure. In some implementations, an index lower than the highest is used, e.g., the third highest index. The intra clip leveler determines 525 the gain change to the audio data using a coordinate system 200 (mapping table) such as illustrated in FIG. 2.

Figure 2:
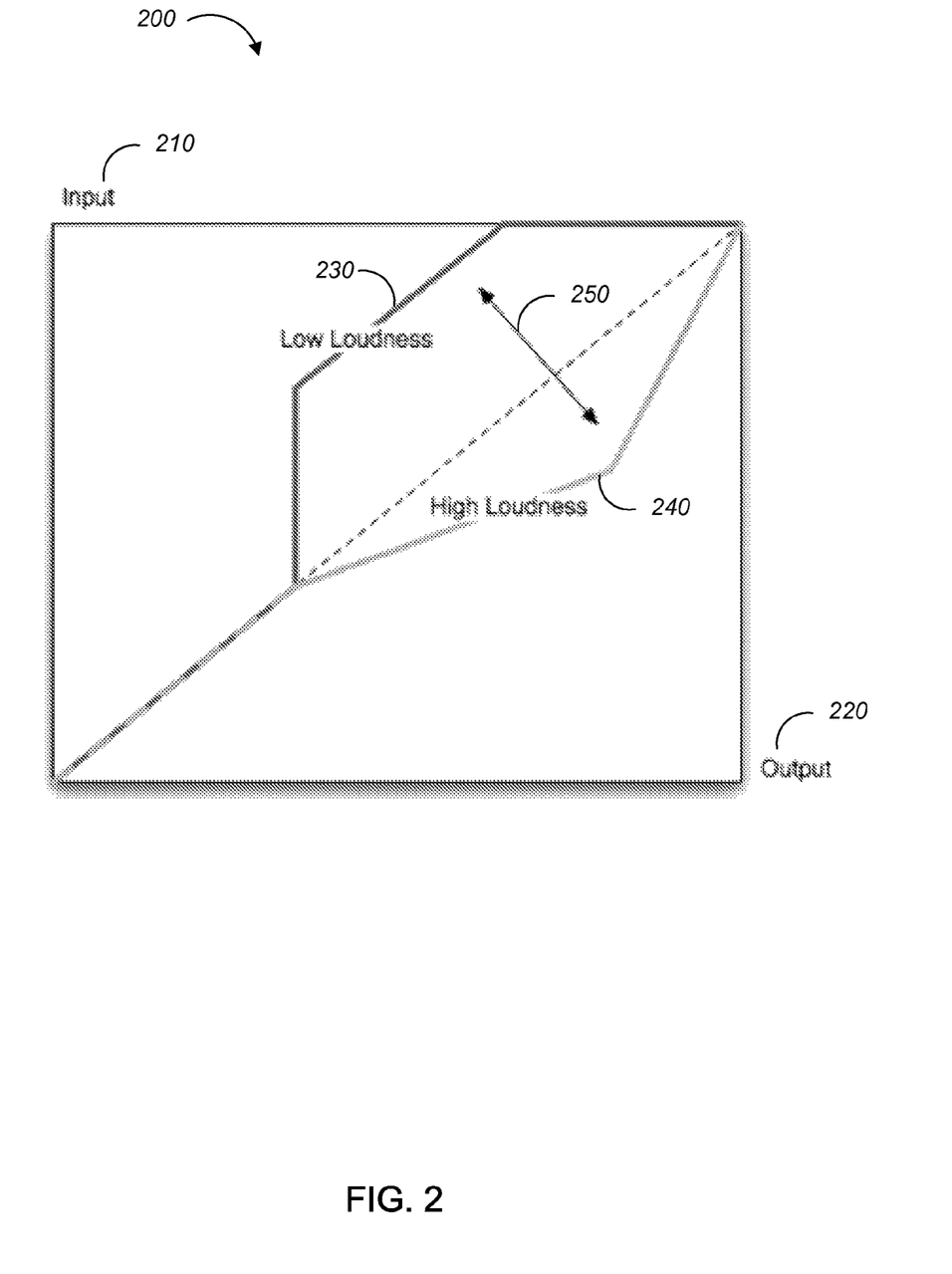
FIG. 2 is a coordinate system illustrating an example mapping between input and output values.

The intra clip leveler maps 530 the RMS value (the ordinate on the axis 210) representing the loudness of the audio data in the current time partition to an output value (the abscissa on the axis 220) according to the coordinate system shown in FIG. 2. The intra clip leveler then computes 540 the ratio between the input value and output value. This computed ratio defines the gain change 550 which is applied 560 to the audio data in the current time partition. The characteristic curves 230, 240 in the coordinate system 200 can be adapted as needed. The curves define attenuation characteristics for high level signals as well as the amplification characteristics of low level signals.

In some implementations, the audio processing moves the time varying dynamic range of an audio signal into a target range defined by a reference level and a mapping table. The user can define a reference level for the intra clip leveler, at which the audio signal is to be maintained, either by amplifying or attenuating the signal. Internal parameters of the involved components are dynamically adjusted in order to produce a natural sounding result.

In some implementations, different partitions of the audio data can have different loudness. As a result, the amplification applied can vary for different partitions. Additionally, if the audio data of a particular partition has a low level (e.g., the RMS of the noise floor is low and the peak of the signal is in the same range) the amplification can be limited to a specified level or limited relative to the amplification provided when the signal has a low RMS of the noise floor noise floor but with high peaks. In some implementations, the maximum amplification applied by the intra clip leveler depends on both the peak and the noise floor levels.

As shown in FIG. 1, the audio data is processed by the optional compressor 160 that is configured using static settings. This compressor can be a broad-band or multi-band compressor as commonly known and used in digital audio equipment. Similarly, the other audio components can also be broad-band or multi-band components.

In some implementations, the audio data is processed by the optional limiter 170 that is configured using static settings. The purpose of this limiter is to filter out potential peaks that might be contained in the audio data. Sometimes, after processing, the audio data may contain amplitude values that exceed certain threshold values. The limiter is configured using a static threshold value, which typically clips the audio peaks to the threshold level.

Subsequently, the processed audio data are output for playback, storage, transmission, or further processing outside of the arrangement 100. The further processing can include different editing operations e.g., using a digital audio workstation. In some implementations, the audio or control data flow is different. For example, a smaller or greater number of components can be involved in the same or a different order or arrangement. Components can occur multiple times and can be configured differently.

A typical example for an application is on-board airplane entertainment. Providing a desired RMS (reference level) where there is a reduced dynamic range due to the high noise floor, can require special audio processing. This processing is used to provide specially adapted soundtracks (e.g., of movies shown on-board). Alternatively, in the complete absence of background noise, the audio signal can be adapted in a similar way.

Figure 6:
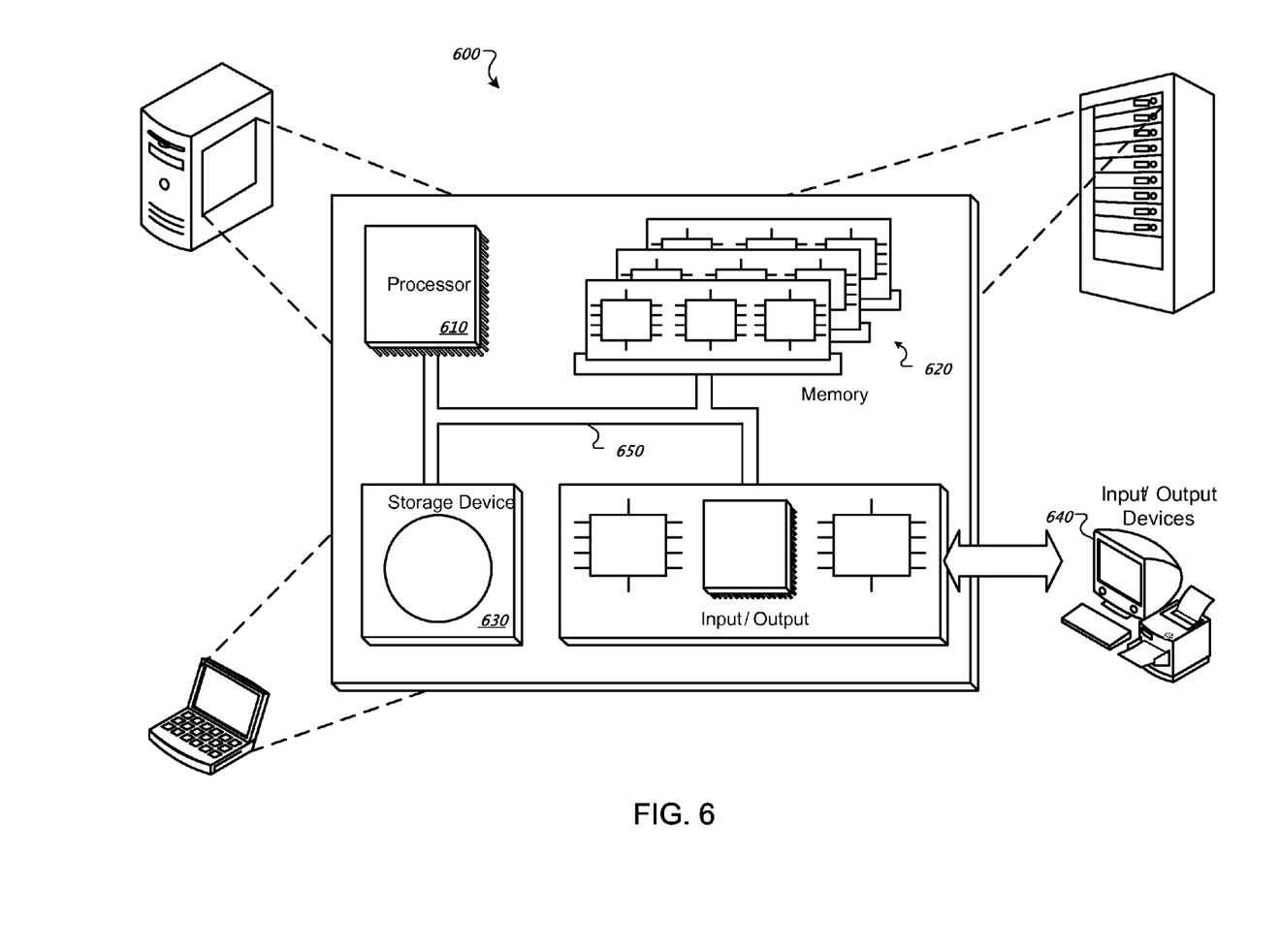
FIG. 6 is a schematic diagram of a generic computer system.

FIG. 6 is a schematic diagram of a generic computer system 600. The system 600 can be used for practicing operations described in association with, for example, the methods 300, 400, and 500. The system 600 can include a processor 610, a memory 620, a storage device 630, and input/output devices 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 is a computer readable medium such as volatile or non volatile that stores information within the system 600. The memory 620 can store data structures, for example. The storage device 630 is capable of providing persistent storage for the system 600. The storage device 630 may be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:
1. A computer-implemented method comprising:
receiving digital audio data;
dividing the audio data into first audio data and second audio data;
segmenting a first portion of the first audio data into a plurality of discrete time partitions according to one or more partitioning parameters;
detecting, by data processing apparatus, a plurality of root mean square (RMS) values for the audio data of the plurality of discrete time partitions, wherein the plu- rality of RMS values include a distinct RMS value for the audio data of each respective time partition;

storing the plurality of RMS values for the audio data of the plurality of discrete time partitions in a first data structure;

sorting the plurality of RMS values according to a sorting criteria, wherein the sorted RMS values are stored in a second data structure;

selecting, from the sorted RMS values stored in the second data structure, an RMS value that is not the highest of the RMS values stored in the second data structure;

determining a current noise floor value according to a plurality of noise estimator parameters including a previous noise floor value, a damping factor, and a second RMS value that is the lowest of the RMS values stored in the second data structure;

using the selected RMS value to determine a gain adjustment for at least a portion of the second audio data corresponding to a first time partition of the first portion of the first audio data;

modifying the portion of the second audio data according to the gain adjustment based on the current noise floor value; and outputting the modified second audio data.

2. The computer-implemented method of claim 1, wherein the partitioning parameters include one or more of a partition count, a partition size, or an offset value.

3. The computer-implemented method of claim 1, further comprising:
determining a time delay according to the partitioning parameters; and
delaying the second audio data by the time delay.

4. The computer-implemented method of claim 1, further comprising determining one or more of a peak value or a crest factor for the first audio data associated with each discrete time partition.

5. The computer-implemented method of claim 4, wherein storing the plurality of RMS values in the first data structure includes:
sequentially inserting, for each discrete time partition, an element into the first data structure, the element including one or more of the RMS value, the peak value, or the crest factor.

6. The computer-implemented method of claim 5, further comprising:
using the first data structure according to first data structure parameters, the first data structure parameters being determined according to the partitioning parameters, the first data structure parameters including a data structure size and an index, the first data structure being a first-in-first-out data structure having a first and a last element.

7. The computer-implemented method of claim 1, further comprising:
using the second data structure according to second data structure parameters, the second data structure parameters being determined according to the partitioning parameters, the second data structure parameters including a data structure size and an index.

8. The computer-implemented method of claim 1, wherein the using of the selected RMS value to determine the gain adjustment comprises:
identifying a mapping table including mappings from input data to output data;
mapping, using the mapping table, the selected RMS value to an output value; and
computing a ratio of the output value to the selected RMS value, wherein the gain adjustment is based on the ration.

9. The computer-implemented method of claim 1, further comprising:
using a noise gate having one or more noise gate parameters; and
controlling the noise gate parameters according to the noise estimator parameters at intervals determined according to the partitioning parameters.

10. The computer-implemented method of claim 1, wherein:
the sorted RMS values are stored in the second data structure in an ascending order such that the highest of the sorted RMS values is stored in a highest indexed element of the second data structure; and
the selecting of the RMS value comprises selecting the RMS value from an element other than the highest indexed element.

11. The computer-implemented method of claim 1, wherein:
the sorted RMS values are stored in the second data structure in an ascending order such that a lowest of the sorted RMS values is stored in a lowest indexed element of the second data structure; and
the method further comprises retrieving the second RMS value from the lowest indexed element.

12. A computer program product, tangibly stored on a non-transitory computer readable medium, comprising instructions that when executed on a server cause the server to perform operations comprising:
receiving digital audio data;
dividing the audio data into first audio data and second audio data;
segmenting a first portion of the first audio data into a plurality of discrete time partitions according to one or more partitioning parameters;
detecting a plurality of root mean square (RMS) values for the audio data of the plurality of discrete time partitions, wherein the plurality of RMS values include a distinct RMS value for the audio data of each respective time partition;
storing the plurality of RMS values for the audio data of the plurality of discrete time partitions in a first data structure;
sorting the plurality of RMS values according to a sorting criteria, wherein the sorted RMS values are stored in a second data structure;
selecting, from the sorted RMS values stored in the second data structure, an RMS value that is not the highest of the RMS values stored in the second data structure;
determining a current noise floor value according to a plurality of noise estimator parameters including a previous noise floor value, a damping factor, and a second RMS value that is the lowest of the RMS values stored in the second data structure;
using the selected RMS value to determine a gain adjustment for at least a portion of the second audio data corresponding to a first time partition of the first portion of the first audio data;
modifying the portion of the second audio data according to the gain adjustment based on the current noise floor value; and
outputting the modified second audio data.

13. The computer program product of claim 12, wherein the partitioning parameters include one or more of a partition count, a partition size, or an offset value.

14. The computer program product of claim 12, further comprising instructions to perform operations including:
determining a time delay according to the partitioning parameters; and
delaying the second audio data by the time delay.

15. The computer program product of claim 12, further comprising determining one or more of a peak value or a crest factor for the first audio data associated with each discrete time partition.

16. The computer program product of claim 15, wherein storing the plurality of RMS values in the first data structure includes:
sequentially inserting, for each discrete time partition, an element into the first data structure, the element including one or more of the RMS value, the peak value, or the crest factor.

17. The computer program product of claim 16, further comprising instructions to perform operations including:
using the first data structure according to first data structure parameters, the first data structure parameters being determined according to the partitioning parameters, the first data structure parameters including a data structure size and an index, the first data structure being a first-in-first-out data structure having a first and a last element.

18. The computer program product of claim 12, further comprising instructions to perform operations including:
using the second data structure according to second data structure parameters, the second data structure parameters being determined according to the partitioning parameters, the second data structure parameters including a data structure size and an index.

19. The computer program product of claim 12, wherein the using of the selected RMS value to determine the gain adjustment comprises:
identifying a mapping table including mappings from input data to output data;
mapping, using the mapping table, the selected RMS value to an output value; and
computing a ratio of the output value to the selected RMS value, wherein the gain adjustment is based on the ratio.

20. The computer program product of claim 12, further comprising instructions to perform operations including:
using a noise gate having one or more noise gate parameters; and
controlling the noise gate parameters according to the noise estimator parameters at intervals determined according to the partitioning parameters.

21. A system comprising:
one or more computers configured to perform operations including:
receiving digital audio data;
dividing the audio data into first audio data and second audio data;
segmenting a first portion of the first audio data into a plurality of discrete time partitions according to one or more partitioning parameters;
detecting a plurality of root mean square (RMS) values for the audio data of the plurality of discrete time partitions, wherein the plurality of RMS values include a distinct RMS value for the audio data of each respective time partition;
storing the plurality of RMS values for the audio data of the plurality of discrete time partitions in a first data structure;
sorting the plurality of RMS values according to a sorting criteria, where the sorted RMS values are stored in a second data structure;
selecting, from the sorted RMS values stored in the second data structure, an RMS value that is not the highest of the RMS values stored in the second data structure;
determining a current noise floor value according to a plurality of noise estimator parameters including a previous noise floor value, a damping factor, and a second RMS value that is the lowest of the RMS values stored in the second data structure;
using the selected RMS value to determine a gain adjustment for at least a portion of the second audio data corresponding to a first time partition of the first portion of the first audio data;
modifying the portion of the second audio data according to the gain adjustment based on the current noise floor value; and
outputting the modified second audio data.

22. The system of claim 21, wherein the partitioning parameters include one or more of a partition count, a partition size, or an offset value.

23. The system of claim 21, further configured to perform operations including:
determining a time delay according to the partitioning parameters; and
delaying the second audio data by the time delay.

24. The system of claim 21, further comprising determining one or more of a peak value or a crest factor for the first audio data associated with each discrete time partition.

25. The system of claim 24, wherein storing the plurality of RMS values in the first data structure includes:
sequentially inserting, for each discrete time partition, an element into the first data structure, the element including one or more of the root mean square value, the peak value, and the crest factor.

26. The system of claim 25, further configured to perform operations including:
using the first data structure according to first data structure parameters, the first data structure parameters being determined according to the partitioning parameters, the first data structure parameters including a data structure size and an index, the first data structure being a first-in-first-out data structure having a first and a last element.

27. The system of claim 21, further configured to perform operations including:
using the second data structure according to second data structure parameters, the second data structure parameters being determined according to the partitioning parameters, the second data structure parameters including a data structure size and an index.

28. The system of claim 21, wherein the using of the selected RMS value to determine the gain adjustment comprises:
identifying a mapping table including mappings from input data to output data;
mapping, using the mapping table, the selected RMS value to an output value; and
computing a ratio of the output value to the selected RMS value, wherein the gain adjustment is based on the ratio.

29. The system of claim 21, further configured to perform operations including:
 using a noise gate having one or more noise gate parameters; and
 controlling the noise gate parameters according to the noise estimator parameters at intervals determined according to the partitioning parameters.

* * * * *